United States Patent Office 3,557,217
Patented Jan. 19, 1971

3,557,217
PROCESS FOR UPGRADING OF CARBONYL STREAMS
Grover C. Royston, East Baton Rouge, La., assignor to Copolymer Rubber & Chemical Corporation, a corporation of Louisiana
No Drawing. Filed Aug. 18, 1967, Ser. No. 661,519
Int. Cl. C07c 49/08, 49/10
U.S. Cl. 260—593                                                       14 Claims

ABSTRACT OF THE DISCLOSURE

A byproduct carbonyl stream produced in the preparation of butadiene by the catalytic dehydrogenation of butylene, which contains water, acetone, methyl vinyl ketone and methyl ethyl ketone, is upgraded by a novel process wherein the water content is separated as a heavy phase by calcium chloride treatment, the acetone is removed by distillation, the methyl vinyl ketone is reacted with an ethylenically unsaturated compound, and thereafter the methyl ethyl ketone is separated from the reaction mixture.

---

This invention relates to a novel process for upgrading a byproduct carbonyl stream produced in the preparation of butadiene by the catalytic dehydrogenation of butylene.

The preparation of butadiene by the catalytic dehydrogenation of butylene is a well-known process which is disclosed in a number of issued United States patents. One process involves the use of a calcium-nickel phosphate catalyst which is described broadly in Dow Chemical Company's U.S. Pat. No. 2,442,320. In accordance with the general process, butylene is dehydrogenated over the catalyst in the presence of steam to produce a mixture of reaction products including 1,3-butadiene and carbonyl compounds, the carbonyl compounds are removed from the reaction mixture as a byproduct carbonyl stream, and 1,3-butadiene is recovered with copper ammonium acetate.

The byproduct carbonyl compounds include acetone, methyl ethyl ketone and methyl vinyl ketone. The carbonyl stream also has a substantial water content, and small amounts of other substances such as aldehydes, vinylcyclohexene and styrene. While the composition of the carbonyl stream varies somewhat, it usually contains on a weight basis over 50% acetone, over 20% methyl ethyl ketone, and over 8% methyl vinyl ketone. The carbonyl stream is produced in large quantities in commercial butadiene plants, and it has very little value as produced due in part to its undesirable odor and lachrymous properties. The marketing of the carbonyl stream is further complicated by the presence of approximately 5–10% of dissolved water which forms an azeotropic mixture with methyl ethyl ketone. Additionally, the methyl vinyl ketone cannot be separated by distillation from methyl ethyl ketone due to the close boiling points, and the acetone is difficult to recover in high purity by distillation due to contamination by methyl vinyl ketone and other substances.

Up until the present invention, all attempts to remove the water content of the carbonly stream have either been unsuccessful or economically unsound. Additionally, there has been no entirely satisfactory way to separate the methyl vinyl ketone from the methyl ethyl ketone and obtain commercially useful products from each.

It is an object of the present invention to provide a novel process for upgrading byproduct carbonyl streams of the type produced in the preparation of butadiene by the catalytic dehydrogenation of butylene.

It is a further object to provide a novel process for preparing commercially useful products from a carbonyl stream of the above type including an acetone fraction, a methyl ethyl ketone fraction, and a reaction product of methyl vinyl ketone and an ethylenically unsaturated compound.

It is still a further object to provide a novel process for the preparation of Diels-Alder adducts of methyl vinyl ketone.

It is still a further object to provide a novel process for preparing interpolymers of methyl vinyl ketone and ethylenically unsaturated compounds which contain a reactive terminal double bond.

Still other objects and advantages of the invention will be apparent to those skilled in the art upon reference to the following detailed description and the specific examples.

The byproduct carbonyl streams to be upgraded in accordance with the invention may vary widely in composition. A typical analysis for one stream is as follows:

| Substance: | Weight percent |
|---|---|
| Substances lighter than acetone | 1.05 |
| Acetone | 52.61 |
| Methyl ethyl ketone | 23.15 |
| Methyl vinyl ketone | 8.44 |
| Vinyl cyclohexene | 1.19 |
| Ethyl benzene | 1.64 |
| Styrene | 0.63 |
| Water | 8.54 |
| Unidentified substances | 2.74 |

It is understood that the major components in the above mixture may vary as much as plus or minus 5 to 25 percent, or even more. The water content is usually between 5 and 15 weight percent, and in most instances between 6 and 10 weight percent. The above carbonyl stream may be upgraded by the following steps:

(1) Calcium chloride is added to the mixture to form a heavier water phase and a lighter carbonyl phase, and the two phases are separated;

(2) Acetone is distilled from the mixture;

(3) The methyl vinyl ketone is reacted in the presence of the methyl ethyl ketone with at least one reactive ethylenically unsaturated compound; and (4) The methyl ethyl ketone is separated from the product of the reaction of methyl vinyl ketone and the ethylenically unsaturated compound.

The first three of the foregoing steps may be performed without regard to sequence. For instance, Steps 1–3 may be performed in the sequence given above as is usually preferred, Step 1 may be followed by Step 3 and then Step 2, Step 2 may be followed by Step 1 and then Step 3, Step 2 may be followed by Step 3 and then Step 1, Step 3 may be followed by Step 1 and then Step 2, or Step 3 may be followed by Step 2 and then Step 1. The water removal step is always carried out before recovery of the methyl ethyl ketone by distillation as otherwise an azeotropic mixture of water and methyl ethyl ketone will be formed.

The mixture should be treated with sufficient calcium chloride to cause a heavier water phase to separate from a lighter carbonyl phase. The mixture should be treated with at least 0.5 and preferably at least 1.0 part by weight of calcium chloride for each part by weight of water. The upper limit on the amount of calcium chloride to be employed is practical in nature, but for best results the water that is present should be capable of dissolving the calcium chloride so as to prevent undissolved solid calcium chloride from contaminating the carbonyl phase. While the calcium chloride is preferably added in the solid anhydrous form, calcium chloride hydrates or highly concentrated brines may be employed.

In most instances, each 100 parts by weight of the carbonyl mixture is treated with about 1–10 parts by weight of calcium chloride. Better results are often obtained when the calcium chloride is in the form of solid anhydrous calcium chloride and is added in a plurality of treating steps.

Treatment with a given total quantity of calcium chloride in a plurality of stages results in much more efficient use of the calcium chloride, and substantially less is required to achieve a desired degree of water removal.

It is important that the separated heavier water phase be highly concentrated in calcium chloride, and preferably it should contain at least 1 mole of calcium chloride for each 6 moles of water in at least the last treatment step. This assures that a minimum amount of the carbonyls remain dissolved in the separated water phase. The degree of water removal is also enhanced and usually the water content of the lighter carbonyl phase is reduced to 0.3 weight percent or less. Even lower concentrations of water may be achieved by adding the calcium chloride in quantities to provide a still higher concentration of calcium chloride in the separated water phase. In instances where water is present in the added calcium chloride, such as when a solid calcium chloride hydrate or a concentrated calcium chloride brine is used which contains more than 1 mole of solid anhydrous calcium chloride for each 6 moles of water, then such water is taken into consideration in calculating the amount of calcium chloride to be added.

The heavier water phase may be separated from the lighter carbonyl phase by any convenient method. For instance, the lighter carbonyl phase may be decanted, or the heavier water phase may be withdrawn via a conduit and discarded.

The acetone may be separated from the mixture by distillation before or after dewatering. It is preferred that a highly efficient distillation column be employed as otherwise the acetone product may not meet commercial specifications.

A wide variety of mono- and polyethylenically unsaturated compounds may be reacted with the methyl vinyl ketone. One preferred group of ethylenically unsaturated compounds includes dienophiles of the types known to undergo a Diels-Alder reaction with methyl vinyl ketone. The dienophiles have a conjugated double bond system and include acyclic conjugated dienes containing 4–10 carbon atoms, such as 1,3-butadiene, isoprene, 2,3-dimethyl-1,3-butadiene, and the halogenated derivatives thereof such as chloroprene, and cyclic compounds containing a conjugated double bond system such as cyclopentadiene and the halogenated derivatives thereof. Conjugated dienes containing more than two double bonds such as 3-methyl-1,4,6-heptatriene also may be used.

Other specific dienophiles include myrcene, alkyl substituted cyclopentadienes wherein the alkyl groups contain 1–8 carbon atoms, such as 1,1,2-trimethylcyclopentadiene-1,3, cyclohexadiene-1,3, and 1,3,5,5-tetramethylcyclohexadiene-1,3. Still other dienophiles include oxygen-heterocyclic 1,3-dienes including furan, furoic acid, cumalin, 2-methyl cumalin, and sylvan (2-methyl furan). It is understood that homologues and/or halogen derivatives of the foregoing substances may be employed.

In instances where a dienophile is used as the unsaturated compound, the Diels-Alder reaction may be carried out by adding the dienophile to the methyl vinyl ketone-methyl ethyl ketone mixture and heating where necessary. The reaction conditions need not differ from those normally employed in Diels-Alder reactions, and a catalyst is not necessary and is not usually employed. The reaction temperature that is used will vary somewhat from dienophile to dienophile, but usually a temperature between room temperature and the boiling point of the mixture is satisfactory.

A large number of ethylenically unsaturated compounds which do not contain a conjugated double bond system may be polymerized with the methyl vinyl ketone. It is often preferred that such compounds contain a terminal double bond and thus include a $CH_2{=}C{=}$ grouping. Specific examples include styrene, vinyl naphthalene and their homologues, alpha olefins containing for example, 2–20 and preferably 2–8 carbon atoms, halogen containing vinyl monomers including vinyl chloride and vinylidene chloride, acrylic and methacrylic acids and the esters thereof, and especially the methyl and ethyl esters, vinyl acetate, vinyl pyridine, acrylamide, etc. One or more of the above compounds may be interpolymerized with the methyl vinyl ketone under polymerization conditions which are well-known to the art. The polymerization conditions usually include a free radical catalyst such as azobisisobutyronitrile, the organic peroxides in general such as benzoyl peroxide, and other known free radical catalysts. The polymerization may be conducted in the presence of the methyl ethyl ketone at temperatures up to the boiling point of the mixture.

In instances where a highly volatile dienophile or other ethylenically unsaturated compound is used, such as 1,3-butadiene, the reaction is carried out in a pressure vessel under sufficient pressure to result in liquid phase conditions. Such pressure conditions need not differ from those normally employed in prior art polymerizations.

The reaction product is recovered from the methyl ethyl ketone and any other substances which are present. The water must be removed prior to the recovery of the methyl ethyl ketone by distillation as otherwise an azeotropic mixture will be formed. The acetone, if present, is also distilled off. In instances where the reaction product is a liquid, it may be recovered by distillation or vacuum distillation following prior art procedures. When the reaction product is a polymer, it may be recovered by pouring the reaction mixture into a lower alcohol such as isopropanol, by flashing off the methyl ethyl ketone, or by other prior art methods.

The foregoing detailed discussion and the foregoing specific examples are for purposes of illustration only, and are not intended as being limiting to the spirit or scope of the appended claims.

EXAMPLE I

This example illustrates the drying of a carbonyl by-product stream obtained in a process for the preparation of 1,3-butadiene from butylenes in the presence of a Dow catalyst. The carbonyl stream contained the following substances initially on a weight basis:

| Substance: | Weight percent |
|---|---|
| Substances lighter than acetone | 1.42 |
| Acetone | 53.51 |
| Methyl ethyl ketone | 23.49 |
| Methyl vinyl ketone | 8.03 |
| Vinylcyclohexene | 0.67 |
| Styrene | 0.85 |
| Water | 8.34 |
| Unidentified substances | 3.69 |

Samples of the above carbonyl stream were treated once with quantities of solid anhydrous calcium chloride varying between 1 and 8 parts by weight for each 100 parts by weight of the carbonyl stream. In an additional run, a sample of the carbonyl stream was treated twice with 2 parts by weight of solid anhydrous calcium chloride for each 100 parts by weight of the carbonyl stream.

After addition of the calcium chloride, the mixture was shaken until complete solution of the calcium chloride occurred. A heavier liquid water phase separated from the lighter liquid carbonyl phase. The heavier water phase was drained off and the upper carbonyl phase was examined by gas chromatography to determine the residual water content in the organic phase from each run. The following data were obtained:

TABLE I

Parts by weight of anhydrous calcium chloride: / Residual water content, weight percent

| Parts by weight of anhydrous calcium chloride | Residual water content, weight percent |
| --- | --- |
| 0 | 8.34 |
| 1 | 3.8 |
| 2 | 2.6 |
| 3 | 2.0 |
| 4 | 1.65 |
| 6 | 0.9 |
| 8 | 0.3 |
| 10 | <0.3 |

In the run where the carbonyl stream was given two treatments with 2 parts of calcium chloride in each treatment, with the water phase being withdrawn between treatments, the residual water content was 0.9 after the second treatment. Thus, two treatments with 2 parts of calcium chloride in each treatment, i.e. a total of 4 parts of calcium chloride, is equivalent to a single treatment with 6 parts of calcium chloride.

EXAMPLE II

This example illustrates the drying of a wet byproduct carbonyl stream similar to that of Example I, but containing 9.2% by weight of water initially. The carbonyl stream was obtained in the same manner and had other substances present in approximately the same quantities as in Example I.

The general procedure of Example I was followed, with the exception that one sample of the wet carbonyl stream was given four successive treatments with 1 part by weight of solid anhydrous calcium chloride for each 100 parts by weight of the carbonyl stream. The separated heavier water phase was withdrawn after each treatment, and the lighter carbonyl phase was examined after each treatment by gas chromatography to determine the residual water content. The following data were obtained:

TABLE II

| No. of CaCl₂ treatments, each 1 part by weight | Residual water content, weight percent |
| --- | --- |
| 0 | 9.2 |
| 1 | 3.65 |
| 2 | 2.5 |
| 3 | 2.0 |
| 4 | 1.0 |

When the above data are compared with the data of Example I, it may be seen that much lower water contents resulted for a given calcium chloride usage.

EXAMPLE III

This example illustrates the separation of an acetone fraction and a methyl vinyl ketone-methyl ethyl ketone fraction from a byproduct carbonyl stream in accordance with the invention.

A byproduct carbonyl stream having the composition given in Example I is dried in accordance with the run of Example I wherein each 100 parts of the carbonyl stream is treated with 8 parts by weight of anhydrous calcium chloride in a single treatment. The residual water content as determined by gas chromatography is 0.3% by weight.

The dried carbonyl stream produced above is distilled using an efficient column. The mixture of substances lighter than acetone is discarded, and subsequent thereto an acetone fraction is distilled off.

The methyl ethyl ketone and methyl vinyl ketone can not be distilled off as separate fractions due to their close boiling points, and a mixture of these two substances is obtained. The high boiling components of the original carbonyl stream remaining after removal of the methyl ethyl ketone and methyl vinyl ketone is discarded as the mixture is too complex for economical separation.

The acetone fraction obtained above is satisfactory as a commercial solvent. The fraction containing the mixture of methyl ethyl ketone and methyl vinyl ketone has an undersirable odor and lachrymous properties and must be treated as set out in the examples appearing hereinafter in order to produce commercial products.

EXAMPLE IV

This example illustrates the preparation of 1-acetylbicyclo(2.2.1)heptene-5 by the Diels-Alder condensation of methyl vinyl ketone with cyclopentadiene in the presence of methyl ethyl ketone.

Freshly distilled cyclopentadiene in an amount of 132 grams (2 moles) was added to 605 grams of a methyl vinyl ketone-methyl ethyl ketone fraction, and the mixture was refluxed until the vapor temperature reached 80° C. The methyl vinyl ketone-methyl ethyl ketone fraction contained 22% by weight of methyl vinyl ketone (1.9 moles), and the fraction was obtained from a byproduct carbonyl stream following the general procedure outlined in Example III.

The reaction mixture was held at reflux for 1½ hours, and then the methyl ethyl ketone was removed by distillation at atmospheric pressure.

The pressure was reduced after distillation of the methyl ethyl ketone, and the 1-acetylbicyclo(2.2.1)heptene-5 was distilled off at a temperature of 38° C. through an 18-inch Vigreux column under a reduced pressure of 0.8 millimeter of mercury. The yield was 269.4 grams, which indicated that all of the methyl vinyl ketone had reacted. The 1-acetylbicyclo(2.2.1)heptene-5 thus obtained is useful as an intermediate in the preparation of perfumes.

The methyl ethyl ketone fraction was obtained in an amount of 457.1 grams and contained a small amount of unreacted cyclopentadiene. Redistillation gives a commercially acceptable methyl ethyl ketone product.

Methyl cyclopentadiene may be substituted for cyclopentadiene in this example with comparable results.

EXAMPLE V

This example illustrates the preparation of 4-acetyl-1-cyclohexane from 1,3-butadiene and the methyl vinyl ketone content of a methyl vinyl ketone-methyl ethyl ketone fraction obtained from a byproduct carbonyl stream in accordance with the general procedure of Example III.

A one-gallon autoclave was charged with 1850 cc. of a methyl vinyl ketone-methyl ethyl ketone fraction containing 18.2% by weight of methyl vinyl ketone (4 moles), and the reactor was closed and the vapor space was purged with nitrogen gas. Butadiene was charged to the reactor in an amount of 265 grams (4.9 moles) and the reactor was placed under a pressure of 50 p.s.i.g. with nitrogen. The reaction mixture was heated at 110° C. for 3 hours with stirring, and during this time approximately 54% of the methyl vinyl ketone reacted. The reaction mixture was heated at 125° C. for an additional 7.5 hours to obtain about 92% conversion. The reaction mixture was then cooled, withdrawn and dried over hydrous calcium chloride.

The methyl ethyl ketone was removed by distillation at atmospheric pressure, and the 4-acetyl-1-cyclohexene was distilled under a vacuum of 2-2.5 millimeters of mercury at a temperature of 42-43° C. The yield was about 80% of theory. The 4-acetyl-1-cyclohexene thus obtained is useful as an intermediate in the manufacture of perfumes.

EXAMPLE VI

This example illustrates the preparation of the Diels-Alder adduct of isoprene and methyl vinyl ketone.

A one-gallon autoclave was charged with 1 liter of a methyl vinyl ketone-methyl ethyl ketone fraction obtained in accordance with the general procedure of Example III. The fraction contained 18% by weight of methyl vinyl ketone (149 grams or 2.14 moles), and 170 grams of isoprene (2.5 moles). The vapor space in the reactor was purged with gaseous nitrogen, and then the reactor was heated at 100–105° C. At the end of one hour, most of the methyl vinyl ketone had reacted. The reaction was continued for an additional hour, and then the reactor was cooled, and the product was withdrawn.

The methyl ethyl ketone was removed by distillation at atmospheric pressure and the Diels-Alder adduct was distilled off under a reduced pressure of 0.5 millimeter of mercury at a temperature of 41–43° C. The Diels-Alder adduct was obtained in approximately 50% yield. It is useful in the preparation of perfumes.

EXAMPLE VII

This example illustrates the preparation of the Diels-Alder adduct of methyl vinyl ketone and 3-methyl-1,4,6-heptatriene.

A 300 cc. stainless steel autoclave was charged with 112 grams of a methyl vinyl ketone-methyl ethyl ketone fraction containing 24.9% by weight of methyl vinyl ketone which was obtained in accordance with the general procedure of Example III. Then 0.4 gram of Ionox 300 (a polymerization inhibitor), and 44.8 grams of 3-methyl-1,4,6-heptatriene were added to the autoclave. The 3-methyl-1,4,6-heptatriene had been washed four times with aqueous ferrous sulfate, followed by washing with water, and was dried over sodium sulfate.

The reaction was carried out at 125° C. for 3½ hours, and then the reactor was heated to 150° C. and this temperature was held for an additional four hours. At the end of the reaction period, the product was withdrawn from the autoclave, filtered and distilled. The methyl ethyl ketone was distilled at atmospheric pressure, and then the Diels-Alder adduct was distilled over under a reduced pressure of 0.8 millimeters of mercury at a temperature of 60–65° C. The adduct was obtained in a yield of 84.3% of theory. It is useful in the preparation of perfumes.

EXAMPLE VIII

This example illustrates the preparation of the Diels-Alder adduct of myrcene and methyl vinyl ketone.

An autoclave was charged with 340 grams of mycrene and 1,155 grams of a methyl vinyl ketone-methyl ethyl ketone fraction containing 18.2% by weight of methyl vinyl ketone. The methyl vinyl ketone-methyl ethyl ketone fraction was obtained from a byproduct carbonyl stream following the general procedure outlined in Example III. The autoclave was heated to 125° C., and this temperature was held for four hours. The reaction mixture was cooled, withdrawn and distilled until a temperature of 84° C. was reached in the head of the still. The residue was then distilled under a reduced pressure of about 0.6–0.7 millimeter of mercury. The yield of the adduct was 65% of theory. The adduct is useful as an intermediate in the preparation of perfumes.

EXAMPLE IX

This example illustrates the polymerization of styrene with the methyl vinyl ketone content of a methyl vinyl ketone-methyl ethyl ketone fraction obtained in accordance with the general procedure of Example III.

Two polymerization bottles were charged with 50 grams each of dry styrene. One of the bottles was charged with 50 grams of a methyl vinyl ketone-methyl ethyl ketone fraction containing 26.5 percent by weight of methyl vinyl ketone, and the other bottle was charged with 75 grams of the same methyl vinyl ketone-methyl ethyl ketone fraction.

The polymerization bottles were flushed for five minutes with nitrogen and capped. Into the first bottle was added 3.2 cc. of a 10% solution of azobisisobutyronitrile in methyl ethyl ketone, and the second bottle was charged with 3.5 cc. of the same solution. The bottles were placed in a water bath heated at 60° C., allowed to remain for 20 hours, and then the contents of the bottles were poured into excess isopropanol. 44 grams of a brittle, resinous polymer was recovered from the first bottle. The second bottle contained 50 grams of polymer having a melt index of 50–60 when run under condition (P).

What is claimed is:

1. A process for upgrading a byproduct carbonyl stream produced in the preparation of butadiene by the catalytic dehydrogenation of butylene, the stream containing a mixture of substances including water, acetone, methyl vinyl ketone, and methyl ethyl ketone, comprising the steps of adding calcium chloride to the mixture to form a heavier water phase and a lighter carbonyl phase, the mixture being treated with at least 0.5 part by weight of calcium chloride for each part by weight of water, separating the heavier water phase from the lighter carbonyl phase, distilling the acetone from the mixture, reacting the methyl vinyl ketone in the presence of methyl ethyl ketone with at least one conjugated diolefin compound under Diels-Alder reaction conditions.

2. The process of claim 1 wherein the mixture is treated with at least one part by weight of calcium chloride for each part by weight of water.

3. The process of claim 1 wherein the heavier water phase that is separated from the lighter carbonyl phase is substantially free of solid calcium chloride and contains at least one mole of calcium chloride for each six moles of water.

4. The process of claim 1 wherein each 100 parts by weight of the mixture is treated with about 1–10 parts by weight of anhydrous calcium chloride.

5. The process of claim 4 wherein each 100 parts by weight of the mixture contains initially about 5–10 parts by weight of water, the mixture is treated with a plurality of portions of solid anhydrous calcium chloride and each 100 parts by weight of the mixture after the final treatment contains no more than 0.3 part by weight of water.

6. The process of claim 1 wherein the ethylenically unsaturated compound has a conjugated double bond system which undergoes a Diels-Alder condensation with methyl vinyl ketone.

7. The process of claim 6 wherein the ethylenically unsaturated compound is selected from the group consisting of cyclopentadiene, 1,3-butadiene, isoprene, 3-methyl-1,4,6-heptatriene and myrcene.

8. A process for upgrading a byproduct carbonyl stream produced in the preparation of butadiene by the catalytic dehydrogenation of butylene, the stream containing a mixture of substances including water, acetone, methyl vinyl ketone, and methyl ethyl ketone, comprising the steps of adding calcium chloride to the mixture to form a heavier water phase and a lighter carbonyl phase, the mixture being treated with at least 0.5 part by weight of calcium chloride for each part by weight of water, separating the heavier water phase from the lighter carbonyl phase, distilling the acetone from the mixture after separating the water phase therefrom, thereafter distilling a methyl vinyl ketone-methyl ethyl ketone fraction from the mixture, reacting the methyl vinyl ketone in the methyl vinyl ketone-methyl ethyl ketone fraction with at least one conjugated dielefin compound under Diel-Alder reaction conditions, and then separating the methyl ethyl ketone from the product of the reaction of the methyl vinyl ketone and the ethylenically unsaturated compound to recover the reaction product therefrom and produce purified methyl ethyl ketone.

9. The process of claim 8 wherein the mixture is treated with at least one part by weight of calcium chloride for each part by weight of water.

10. The process of claim 8 wherein the heavier water phase that is separated from the lighter carbonyl phase is substantially free of solid calcium chloride and contains at least one mole of calcium chloride for each six moles of water.

11. The process of claim 8 wherein each 100 parts by weight of the mixture is treated with about 1–10 parts by weight of anhydrous calcium chloride.

12. The process of claim 11 wherein each 100 parts by weight of the mixture contains initially about 5–10 parts by weight of water, the mixture is treated with a plurality of portions of solid anhydrous calcium chloride and each 100 parts by weight of the mixture after the final treatment contains no more than 0.3 part by weight of water.

13. The process of claim 8 wherein the ethylenically unsaturated compound has a conjugated double bond system which undergoes a Diels-Alder condensation with methyl vinyl ketone.

14. The process of claim 13 wherein the ethylenically unsaturated compound is selected from the group consisting of cyclopentadiene, 1,3-butadiene, isoprene, 3-methyl-1,4,6-hepatriene and myrcene, the methyl ethyl ketone is separated with resulting Diels-Alder adduct by distillation, and then the Diels-Alder adduct is recovered and purified by vacuum distillation.

References Cited

UNITED STATES PATENTS 2,739,176   3/1956   Reilly _____ 260—597

FOREIGN PATENTS 502,813   3/1939   Great Britain _____ 260—593P

BERNARD HELFIN, Primary Examiner

W. B. LONE, Assistant Examiner

U.S. Cl. X.R.

260—586, 680